United States Patent
Needham et al.

(10) Patent No.: US 11,422,575 B2
(45) Date of Patent: Aug. 23, 2022

(54) ADAPTIVE STOW FOR SOLAR TRACKER SYSTEMS

(71) Applicant: FCX Solar LLC, Mont Vernon, NH (US)

(72) Inventors: Christopher Thomas Needham, Mountain View, HI (US); Frank Carl Oudheusden, Mont Vernon, NH (US)

(73) Assignee: FCX Solar LLC, Mont Vernon, NH (US)

( * ) Notice: Subject to any disclaimer, the term of this patent is extended or adjusted under 35 U.S.C. 154(b) by 0 days.

(21) Appl. No.: 17/353,548

(22) Filed: Jun. 21, 2021

(65) Prior Publication Data

US 2021/0311507 A1    Oct. 7, 2021

Related U.S. Application Data

(60) Provisional application No. 63/043,522, filed on Jun. 24, 2020.

(51) Int. Cl.
| | |
|---|---|
| *H02S 20/32* | (2014.01) |
| *F24S 40/80* | (2018.01) |
| *F24S 50/60* | (2018.01) |
| *G05D 3/10* | (2006.01) |
| *G01P 5/00* | (2006.01) |

(52) U.S. Cl.
CPC .............. *G05D 3/105* (2013.01); *F24S 40/85* (2018.05); *F24S 50/60* (2018.05); *G01P 5/001* (2013.01); *H02S 20/32* (2014.12)

(58) Field of Classification Search
CPC .......... F24S 40/85; F24S 50/60; G05D 3/105; H02S 20/32
See application file for complete search history.

(56) References Cited

U.S. PATENT DOCUMENTS

| | | | |
|---|---|---|---|
| 10,601,364 B1 * | 3/2020 | Au | H02S 30/10 |
| 2020/0076355 A1 * | 3/2020 | Hudson | F24S 25/617 |

* cited by examiner

*Primary Examiner* — Thanh Luu
(74) *Attorney, Agent, or Firm* — Perkins Coie LLP; Colin Fowler

(57) ABSTRACT

A solar tracker system includes a photovoltaic panel and an actuator coupled to the photovoltaic panel and configured to actuate to rotate the photovoltaic panel around a base. A controller communicatively coupled to the actuator is configured to detect a direction from which wind is incident on the photovoltaic panel. Based on the direction from which wind is incident on the photovoltaic panel, the controller adaptively controls the actuator to set a stow position of the photovoltaic panel.

23 Claims, 4 Drawing Sheets

ADAPTIVE STOW FOR SOLAR TRACKER SYSTEMS

CROSS-REFERENCE TO RELATED APPLICATION

This application claims the benefit of priority to U.S. Provisional Patent Application Ser. No. 63/043,522, filed Jun. 24, 2020. The aforementioned application is incorporated herein by reference in their entirety.

TECHNICAL FIELD

This disclosure relates generally to solar tracker systems, and in particular to adaptive stow systems and methods for solar tracker systems.

BACKGROUND

Photovoltaic (PV) power systems frequently track the sun to various degrees to increase an amount of energy produced by the system. These trackers typically move photovoltaic modules to adjust an angle of incidence of the sunlight on the surface of the PV modules. In particular, trackers typically rotate the PV modules around an axis principally oriented north to south, tilting the modules to as much as 60 degrees towards the east and west and adjusting tilt within this range throughout the day. By tracking the position of the sun, PV power systems often product 20-30% more energy than fixed-tilt systems.

A common configuration of horizontal single-axis trackers ("SAT") as described above includes a single actuator near the center of a row of PV modules, potentially with 80-120 modules tilted by a single actuator. The angle of tilt is defined by the position of the actuator, while a torque tube or other similar device transfers moments and positions to the rest of the row at this tilt. However, environmental loading (such as wind, snow, or dead load) can twist portions of a row away from the intended tilt angle. This effect motivates design considerations that add cost in order to decrease risk of failures.

DETAILED DESCRIPTION

Embodiments described herein mitigate the effects of wind loading on a photovoltaic system by implementing adaptive stow. In some embodiments, a solar tracker system includes a photovoltaic panel and an actuator coupled to the photovoltaic panel and configured to actuate to rotate the photovoltaic panel around a base. A controller communicatively coupled to the actuator is configured to detect a direction from which wind is incident on the photovoltaic panel. Based on the direction from which wind is incident on the photovoltaic panel, the controller adaptively controls the actuator to set a stow position of the photovoltaic panel. The term "direction" with respect to measured wind refers a 2-dimensional, 360-degree plane parallel to the earth's surface. Notably, the physical direction of wind (as opposed to measured directions) may be more complicated and is more accurately described by a multitude of vectors in 3-dimentions; however, simplifying the manner in which wind is measured improves the ease of discussion. Thus, a measured direction of wind refers to the predominant direction relative to the 2-dimensional, 360-degree plane parallel to the earth's surface.

Figure 1A:
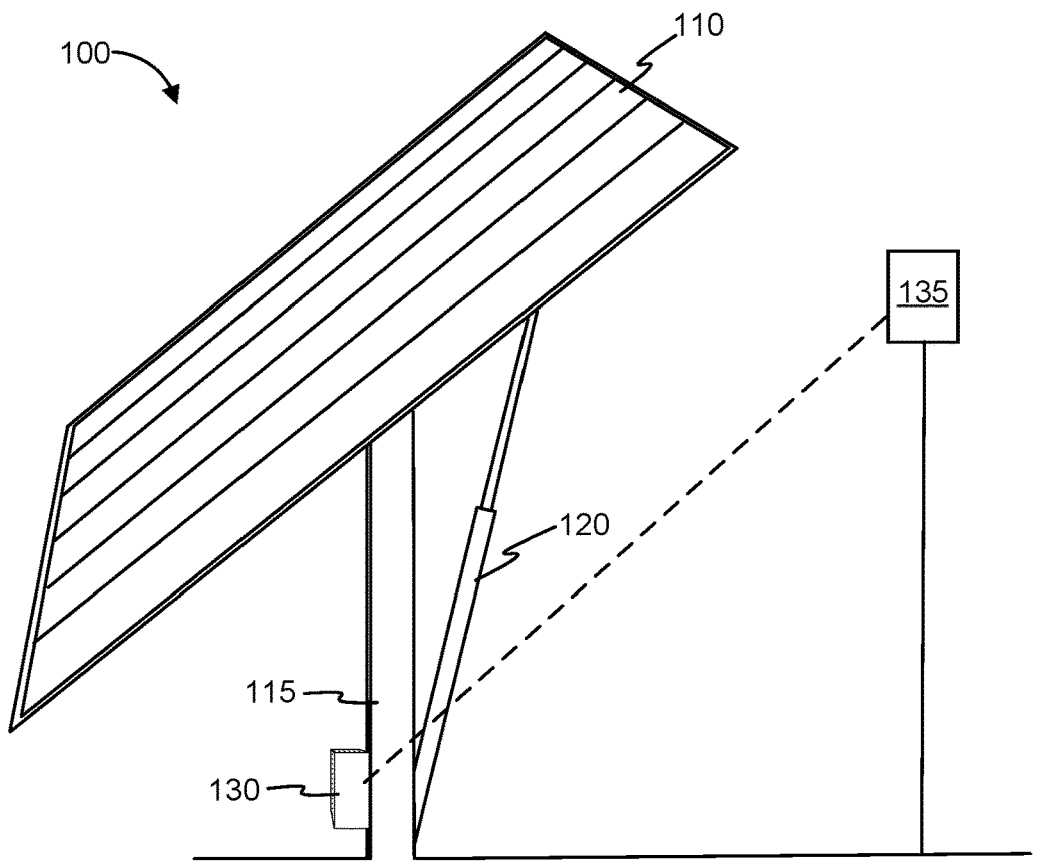
FIG. 1A illustrates a photovoltaic system.

FIG. 1A illustrates a photovoltaic (PV) system 100, according to some embodiments. As shown in FIG. 1A, the PV system 100 may include a PV panel 110, an actuator 120, and a controller 130. The PV system 100 is configured to generate electricity and may be used alone or with other similar photovoltaic systems in, for example, a photovoltaic power station.

The PV panel 110 includes an array of one or more photovoltaic modules configured to convert solar energy into electricity by the photovoltaic effect. The PV panel 110 is rotatably anchored to a base 115, and may be coupled to a power grid, battery, or other power transmission or storage system to output energy captured by the PV panel 110. The amount of electricity produced by each photovoltaic module can be a function of at least the angle of incidence of light on the surface of the module, where more energy is captured when light is perpendicular to the surface (i.e., a zero-degree angle of incidence) than when light is incident at higher angles. Each PV panels are not directly connected to other panels, the positioning of one panel is insulated from the positioning of other panels.

The actuator 120 is configured to rotate the PV panel 110 around one or more axes. The actuator 120 may be a linear actuator coupled to the PV panel 110 and a fixed position, such as the base 115. Increasing or decreasing the length of the linear actuator changes a tilt angle of the PV panel 110 with respect to the base 115. Other types of actuators may be used in other embodiments. For example, the PV panel 110 may be mounted on an axle and a rotary actuator may drive the axle to rotate the PV panel 110 around an axis. In one embodiment, the actuator 120 rotates the PV panel 110 around an axis centered at the base 115 and geographically oriented substantially north to south, such that a surface of the PV panel 110 can be tilted between east- and west-facing angles. The actuator 120 may also rotate the PV panel 110 around additional axes (e.g., an east-west axis), or the photovoltaic system 100 may include one or more additional actuators to cause other movements of the PV panel 110.

The controller 130 generates drive signals that cause the actuator 120 to set a tilt angle of the PV panel 110. To increase the amount of energy captured by the PV panel 110, the controller 130 may set the tilt angle based on a position of the sun. In one embodiment, the controller 130 is coupled to a light sensor (not shown in FIG. 1) to detect a position of the sun during the day. As the day progresses, the controller 130 may drive the actuator 120 to move the PV panel 110 to follow the detected movement of the sun. Thus, the controller 130 drives the actuator 120 to move the PV panel 110 from an orientation facing substantially east to an orientation facing substantially west. Overnight, the controller 130 may drive the actuator 120 to return the PV panel 110 to an east-facing orientation in preparation for sunrise the next morning, or the controller 130 may drive the actuator 120 to rotate the PV panel 110 in response to detecting sunlight in the east. The controller 130 may alternatively control the tilt angle of the PV panel 110 without light feedback, for example based on time of day.

In addition to controlling the actuator to implement daily sun-tracking rotations of the PV panel 110, the controller 130 can generate drive signals that cause the actuator 120 to adaptively stow the PV panel 110 relative to a wind direction. The controller 130 can be communicatively coupled by wired or wireless communication to a wind direction sensor 135, such as an anemometer, force sensors measuring incident wind, force or strain sensors measuring directions of forces applied to the PV panel 110, or any other device capable of detecting the wind direction. As shown in FIG. 1A, the wind direction sensor 135 can be a standalone device positioned near the PV panel 110, but other implementations of the wind direction sensor 135 can be physically coupled to the PV panel 110 or the base 115 or positioned differently with respect to the PV panel 110. In some embodiments, in a given PV array, wind direction sensors 135 are positioned throughout the array and provide granular detection of the direction and/or strength of the wind experienced by panels local to each sensor. Furthermore, multiple wind direction sensors 135, whether the same type or different, can be communicatively coupled to the controller 130, and the sensor(s) 135 can be placed at different locations physically coupled to or near the PV panel 110. Based on the wind direction received from the wind direction sensor 135, the controller 130 generates a control signal to cause the actuator 120 to set a stow position of the PV panel 110.

Additionally, sensors 135 such as anemometers, accelerometers, snow detection sensors, stress/strain sensors, on-site security cameras, irradiance sensors, soiling measurement sensors, humidity sensors, temperature sensors and any other sensor that observes on site environmental conditions may be placed throughout a PV panel array to detect environmental differences such as wind or temperature within the array. In some embodiments, any combination of the sensors may be selected. The sensors selected can depend on the overall weather and climate of the region of the PV panel array. For example, an array placed within a desert would benefit more from including anemometers, humidity sensors, and temperature sensors and less so from including snow detection sensors. The data collected from the sensors can be used to provide an accurate picture of the environmental status of the overall PV array and the differing microclimates within the PV array.

The controller 130 can also be used to generate drive signals that cause the actuator 120 to adaptively stow an individual or a portion of PV panel(s) 110 within a PV array. Multiple sensors 135 communicatively coupled to the controller 130 can be placed throughout the array to acquire this data. Based on the information received, the controller 130 will generate control signals to cause individual actuators to set various stow positions for PV panels within the array. In some embodiments, individual actuators set stow positions for multiple panels simultaneously.

The controller 130 can be used to adaptively change the stow position or tilt the individual panels 110 and/or a portion of the PV array due to being shielded by other parts of the array because of their relative positions. The controller 130 and sensors 135 also can also be used to change the stow position of PV Panel 110 based on localized weather effect, microclimate or physical feature of a local environment of the PV array acquired from the environmental condition sensors 135 placed within the PV array or PV array construction configuration. In some embodiments, using wind speed data collected from the sensors positioned within the PV array, the controller 130 generates a control signal for to the actuator 120 in response to high speed wind conditions.

In some embodiments, where the PV array is located on flat terrain, different sections of the array assume differing stow positions. Those panels on an exterior rim of the PV array provide some wind shielding to the panels on the interior of the array. Accordingly, wind forces experienced on the interior of the array may not be as severe and less extreme stow positions are implemented on the interior than the exterior of the array. Identification of array position may be based on either of initial array controller parameters, or through adaptation to granular sensor data on wind strength throughout the array (e.g., both from the interior and the exterior). In some embodiments, panels on the exterior are positioned reverse to the incoming wind. In this way, the exterior panels cause additional wind resistance and therefore shielding for interior panels.

In another example, where the PV array is positioned within bowl-shaped terrain another set of differing stow positions are implemented. Based on either of initial array controller parameters regarding panel positioning relative to terrain or through adaptation to granular sensor data on wind strength throughout the array, an array controller implements preconfigured stow states that have either steeper or shallower stow angles. Stow states are influenced by wind tunnel testing and identify positions of the array to mitigate the combined effects of the uneven terrain and wind conditions.

The set of preconfigured stow states are positioned about a first axis. The term "first axis" is defined as the axis of rotation of a single axis tracking system. In most configurations, the first axis runs predominantly north-south (e.g., so as to track the sun from east-west). The preconfigured positions are incrementally positioned about the first axis, directly correspond to a direction of the incoming wind force originating from a 180-degree arc about the first axis and on a horizontal plane.

In another example, a PV array is positioned alongside the slope of an incline. For example, the array is arranged where the panels at the top of the arrangement shield the lower panels from winds going down the incline. As such, the panels located at the top of the array are preconfigured to have steeper stow angles to better combat and shield against high speed winds coming down the incline. In some embodiments, the lower panels provide less shielding to the higher panels, so each panel needs to be able to effectively stow against winds blowing up the slope.

In another example, a PV array includes of two panels positioned east-west in the same array. In some embodiments, the panel on the east side will tilt eastward to face a strong gust of wind blowing from the east. Simultaneously, the panel on the west side will tilt westward to face a strong gust of wind blowing from the west. The panels, both in different stow positions simultaneously, are angled to shield the other panel from winds coming from their respective directions.

The division of stow states due corresponding to wind force on one side of the 180-degree arc is mirrored across to create the matching preconfigured stow layout on the opposing side. For example, if a panel tilts 20 degrees below horizontal facing westward when hit with an incoming wind force that hits the panel at precisely 45 degrees NW, an equivalent wind force that hits the panel at precisely 45 degrees NE will cause the panel to tilt 20 degrees below horizontal facing eastward.

In some embodiments, the preconfigured stow states include states that are fully rotated about the first axis toward either direction in addition to multiple stow states that fall as intermediate steps between each fully rotated state. The intermediate stow states enable each PV panel to respond more quickly to fast-changing winds.

The controller 130 can include computer software and hardware to execute the software, special-purpose hardware, or other components to implement the functionality described herein. For example, the controller can include programmable circuitry (e.g., one or more microprocessors), can be programmed with software and/or firmware, can be implemented entirely in special-purpose hardwired (i.e., non-programmable) circuitry, or can include a combination or such forms. Special-purpose circuitry can be in the form of, for example, one or more application-specific integrated circuits (ASICs), programmable logic devices (PLDs), field-programmable gate arrays (FPGAs), etc.

Figure 1B:
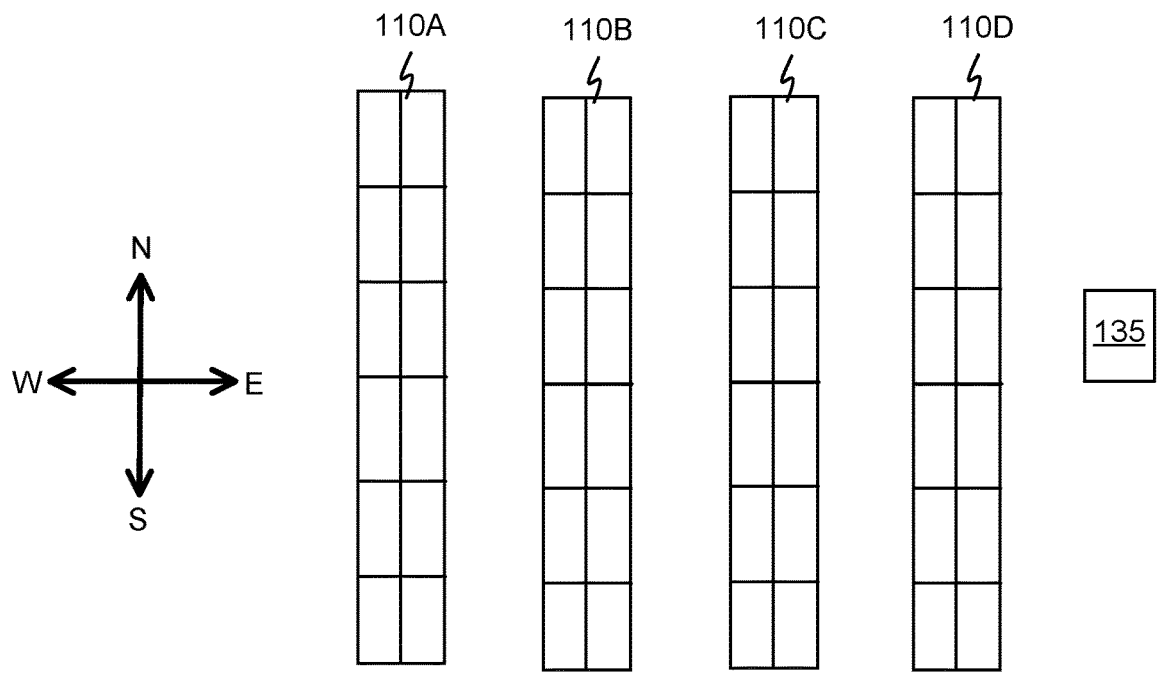
FIG. 1B illustrates a top view of a portion of an example photovoltaic power plant.

The PV panel 110 can be one of many similar panels in a photovoltaic power plant. FIG. 1B is a top view of a portion of an example PV power plant, with multiple panels 110A aligned such that they can tilt from an east-facing direction to a west-facing direction. One or more wind direction sensors 135 can be communicatively coupled to the controllers driving each PV panel 110.

Figure 2A:
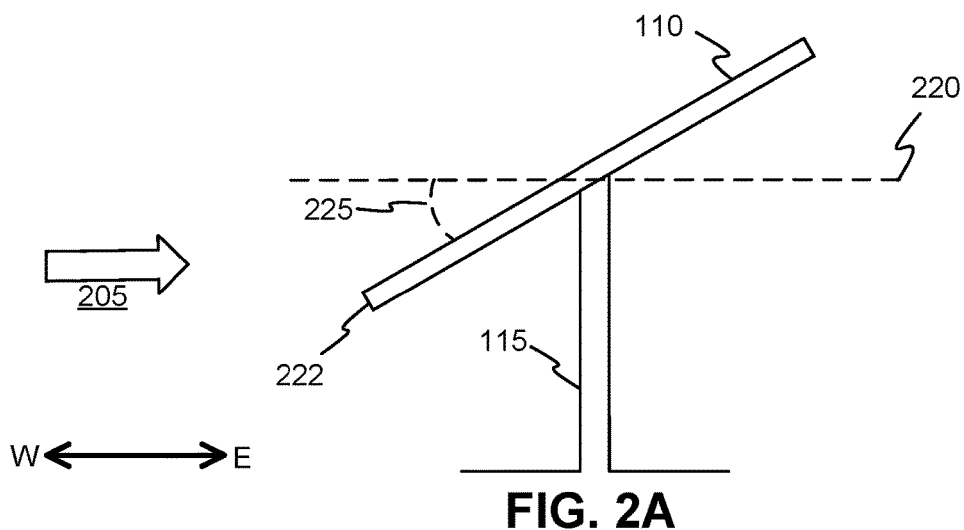
FIGS. 2A-2C illustrate example adaptive stow positions of a photovoltaic panel.
Figure 2B:
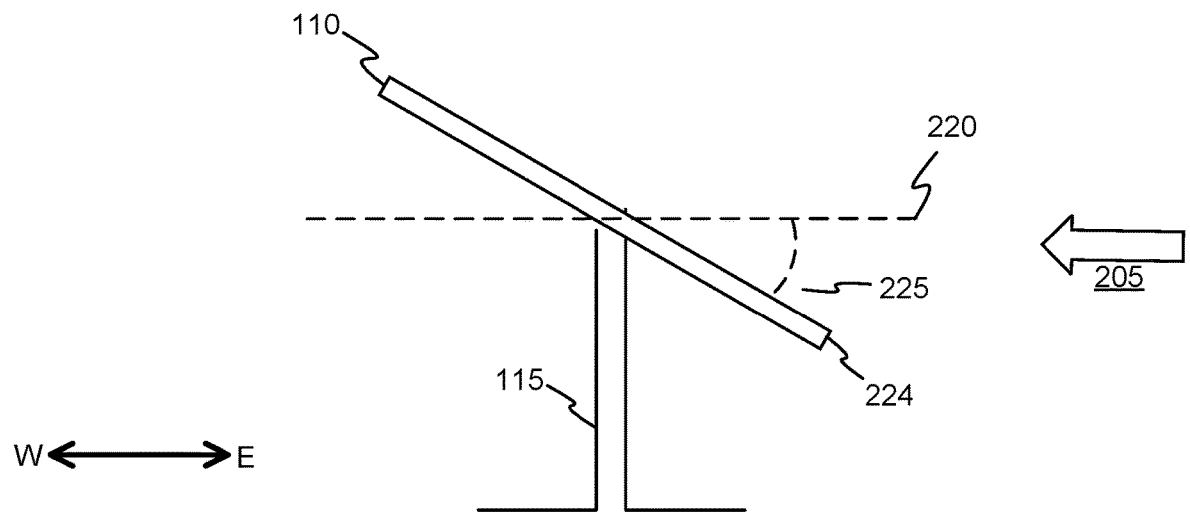
Figure 2C:
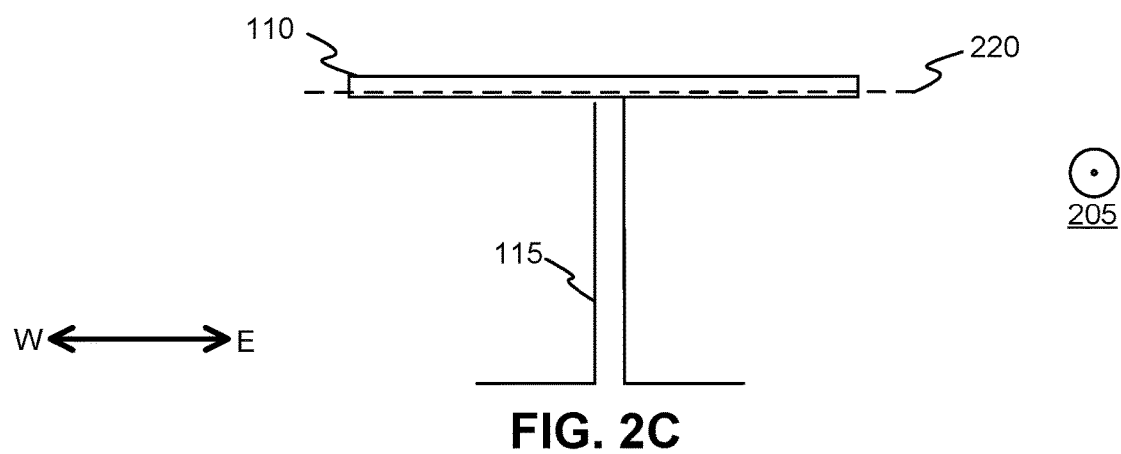

FIGS. 2A-2C illustrate example adaptive stow positions selected by the controller 130 based on angle of wind incident on the PV panel 110. Generally, the controller 130 can cause the PV panel 110 to be stowed at an angle such that a leading edge of the PV panel 110 is angled downward into a wind direction when the wind is incident on the panel 110 from specified ranges of angles. For example, when the PV system 100 rotates the panel 110 around an axis from predominantly facing eastward to predominantly facing westward, the controller 130 can set a stow angle of the PV panel 110 into the wind when the wind is incident from a predominantly eastward or westward direction.

Specifically, in FIG. 2A, a wind direction 205 incident on the panel 110 is direction that is predominantly from the west. In this case, the controller 130 causes the actuator 120 to rotate the PV panel 110 such that a west-facing, leading edge 222 of the panel 110 is angled downward, at an angle 225, below a horizontal axis 220. Similarly, as shown in FIG. 2B, the wind direction 205 is a direction that is predominantly from the east. In this case, the controller 130 causes the actuator 120 to rotate the PV panel 110 such that the east-facing, leading edge 224 of the panel 110 is angled downward at the angle 225 below the horizontal axis 220. The angle 225 can be, for example, between approximately 20° and approximately 30°, such as approximately 25°. In FIGS. 2A and 2B, the horizontal axis 220 can be defined in some implementations as an axis that is substantially parallel to the PV panel 110 when the panel is at rotational midpoint between the PV panel's most eastward-facing angle and its most westward facing angle. Depending on a variety of factors such as the geography of the area where the PV panel 110 is installed, surface topology (e.g., whether the ground is relatively flat or hilly), and wind patterns in the area, the horizontal axis 220 may be substantially parallel to the wind direction, substantially parallel to the ground, or both. Other implementations may instead define the horizontal axis 220 as an axis that is substantially parallel to the ground or the wind direction. The horizontal axis 220 can defined for each PV panel 110 based on the specific geography, surface topology, or wind patterns of the area where the PV panel 110 is installed.

If the wind direction 205 is instead incident on the PV panel 110 from a predominantly northward or southward direction, the controller 130 can select a different stow position or a stow position that is the same as the stow position when the wind originates predominantly from the east or predominantly from the west. For example, FIG. 2C illustrates that when the wind direction 205 is incident from the panel from the north, the controller 130 can cause the actuator 120 to stow the PV panel 110 at an angle that is substantially parallel to the horizontal axis 220.

The panels are configured to stow toward the direction of the oncoming wind flow. Given that the panels operate on a single axis tracker system, the term "toward" is defined with acknowledgment given to the single axis nature of rotation. Where the single axis is aligned to enable the panel to pivot to face east or west, positioning toward the wind is a matter of determining whether the wind flow is arriving from a direct that is more west than it is east, or vice versa. In a given example where the predominant direction of the wind is from the south, but because the wind is more westerly than east, tipping the panel to the west is still "toward" the wind flow.

In some embodiments, the panels are stowed at a flat or parallel to the ground angle in response to certain winds. For example, where the single axis of rotation enables an east-west rotation, a range of angles of wind arriving from predominantly southerly or northerly directions correspond to the flat or parallel stow angle.

Figure 3A:
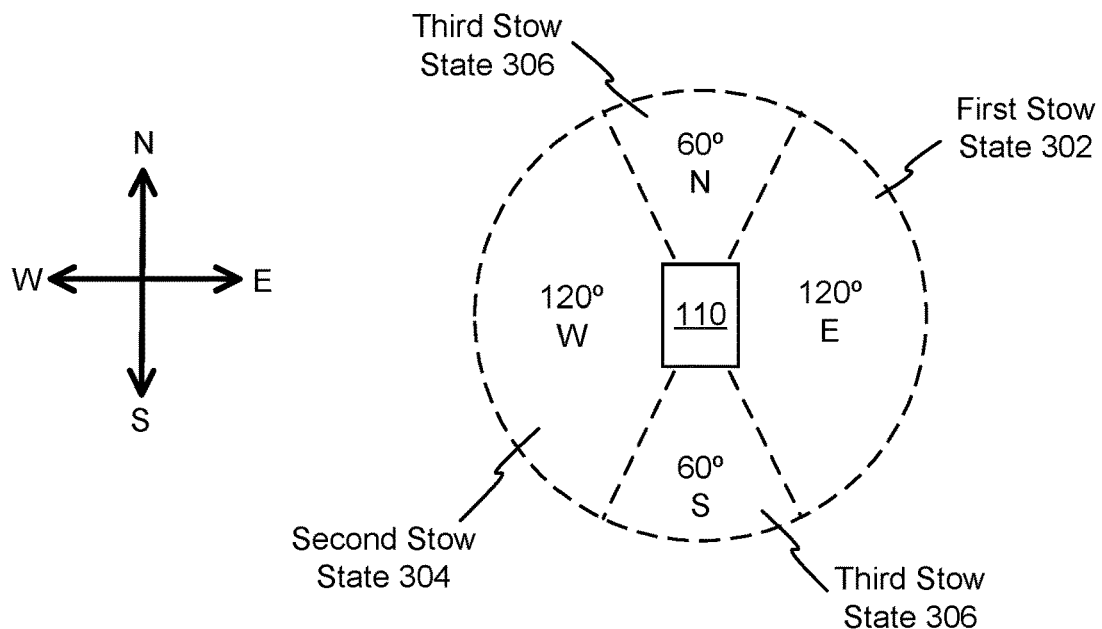
FIG. 3A illustrates example angular ranges of wind directions and their corresponding classification into predominant wind directions.

FIG. 3A is a top view showing example angular ranges of wind directions and their corresponding classification into predominant wind directions (e.g., as being predominantly from the east, west, north, or south). In the example shown in FIG. 3A, the controller 130 can generate output signals to cause the panel 110 to be stored in a first stow state 302 when the wind is incident on the panel 110 from an angle within a 120° arc centered on East. If the wind is incident on the panel 110 from an angle that falls within a 120° arc centered on West, the controller 130 can generate output signals to cause the panel 110 to be stored in a second stow state 304. Finally, if the wind is incident on the panel 110 from an angle that falls within a 60° arc centered on North or South, the controller 130 can generate output signals to cause the panel 110 to be stored in a third stow state 306.

Figure 3B:
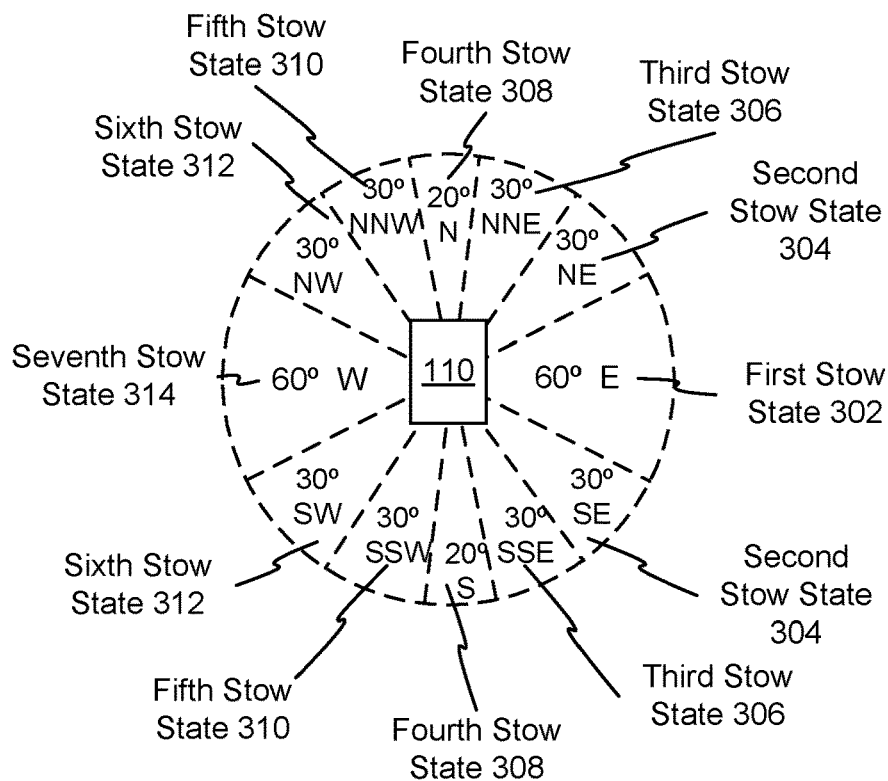
FIG. 3B illustrates example angular ranges of wind directions with increased granularity for increased adaption of the panel to external conditions.

FIG. 3B is a top view showing example angular ranges of wind direction with increased division compared to FIG. 3A. As shown, the predominant wind directions are broken down into smaller categories (e.g. NW, NE, SW, SE, NNW, NNE, SSW, SSE) enabling increased granularity into seven different stow states. The additional stow states enable the panel to switch more quickly between a given stow state to the next because each has a smaller difference in tilt angle between one another. The smaller difference between stow states enables panels to adapt faster to rapidly-changing winds that could otherwise disrupt service or damage the panels.

For example, for the embodiment present in FIG. 3B, a PV array positioned along the top of a hill ridge will have increased protection from changing wind force compared to if the array is comprised of panels with lesser granularity of stow states. winds change quickly across a ridge. If a given wind force hitting the array changes quickly from the SSE direction to E, the panels will more quickly shift to a deep tilt towards the E direction. The SSE wind corresponds to an angle that is already tilted towards slightly toward the E direction. Is there were a single stow state for a S wind that encompassed the SSE wind and that state was substantially horizontal, the panel would have a greater distance to travel to reach the deep tilt toward the E direction. The angular ranges shown in FIGS. 3A and 3B are merely exemplary; other ranges may be used to classify wind directions differently for different PV panels 110.

The wind forces experienced by a given PV panel 110 in operation may be different than the wind forces experienced by another panel operating at a different location. Furthermore, the wind forces experience by different PV panels 110 in the same PV power plant may be different, for example if one PV panel 110 blocks or diverts wind from another PV panel 110, or if geographic features (e.g., hills) in the region of the PV power plant change the wind forces for different portions of the plant. Furthermore, structural differences between different PV panels 110 may change the ability of each panel to withstand various magnitudes and directions of incident wind. Accordingly, it can be desirable to set different parameters of adaptive stow for each PV panel 110, where the parameters include the stow angles of the panel and the ranges of wind angles that will be classified as each predominant wind direction. The adaptive stow parameters can be customized for a PV system using wind tunnel testing.

Figure 4:
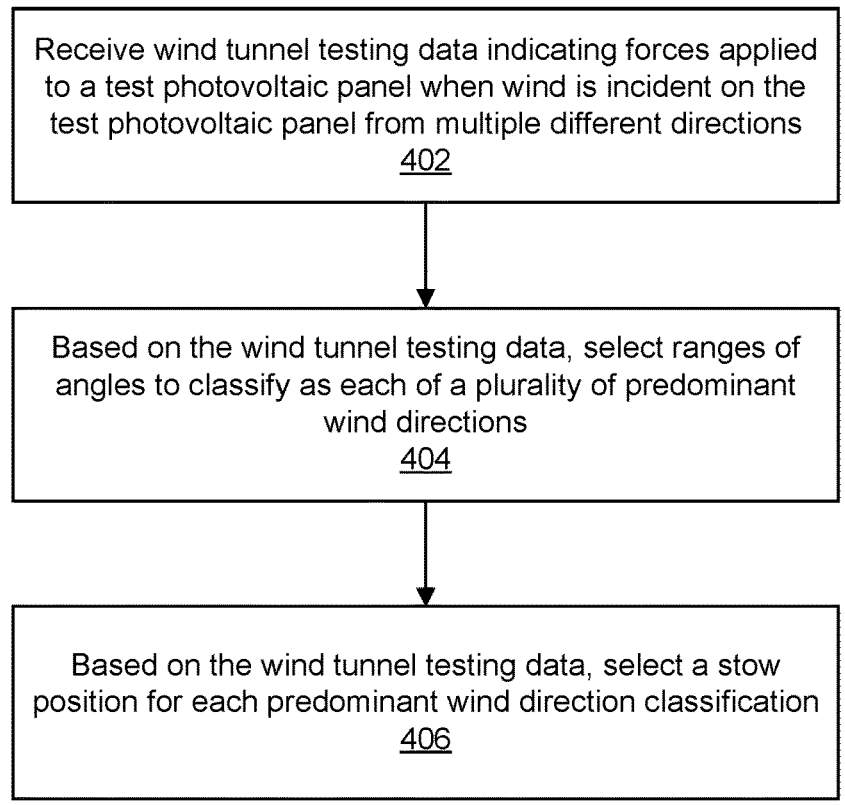
FIG. 4 is a flowchart illustrating a process to select adaptive stow parameters for a photovoltaic system using wind tunnel testing.

FIG. 4 is a flowchart illustrating a process to select adaptive stow parameters for a PV system using wind tunnel testing, according to some embodiments. The process shown in FIG. 4 can be performed by any computing device that is capable of receiving wind tunnel testing data associated with a PV panel that is undergoing testing (herein referred to as a "test PV panel"), analyzing the data to determine forces applied to the test PV panel, and selecting the adaptive stow parameters based on the analyzed data.

As shown in FIG. 4, the computing device receives 402 wind tunnel testing data that indicates forces applied to the test PV panel. The wind tunnel testing can apply wind on the test panel from multiple different directions to measure the forces applied to different portions of the PV panel at each direction. In some cases, the wind directions and magnitudes used in the wind tunnel testing can be selected based on wind patterns at the location where the test PV panel (or panels like the test panel) is to be installed.

The computing device selects 404, based on the wind tunnel testing data, ranges of angles of wind incidence on the test panel to classify as each of a plurality of predominant wind directions. For example, the computing device selects parameters that define the ranges of angles shown in FIGS. 3A and 3B.

The computing device also selects 406, based on the wind tunnel testing data, a stow position for each predominant wind direction classification. The parameters of the stow position can include a direction of tilt of the PV panel 110, as well as the angle to which it is tilted. These angles can be selected to reduce overturning moments about the center of rotation of the PV panel 110, to achieve sufficient stability against aeroelastic or dynamic wind loading failure modes, or to achieve reductions in panel normal loading or forces for at least some portions of an array of PV panels 110 for at least a portion of the array.

Figure 5:
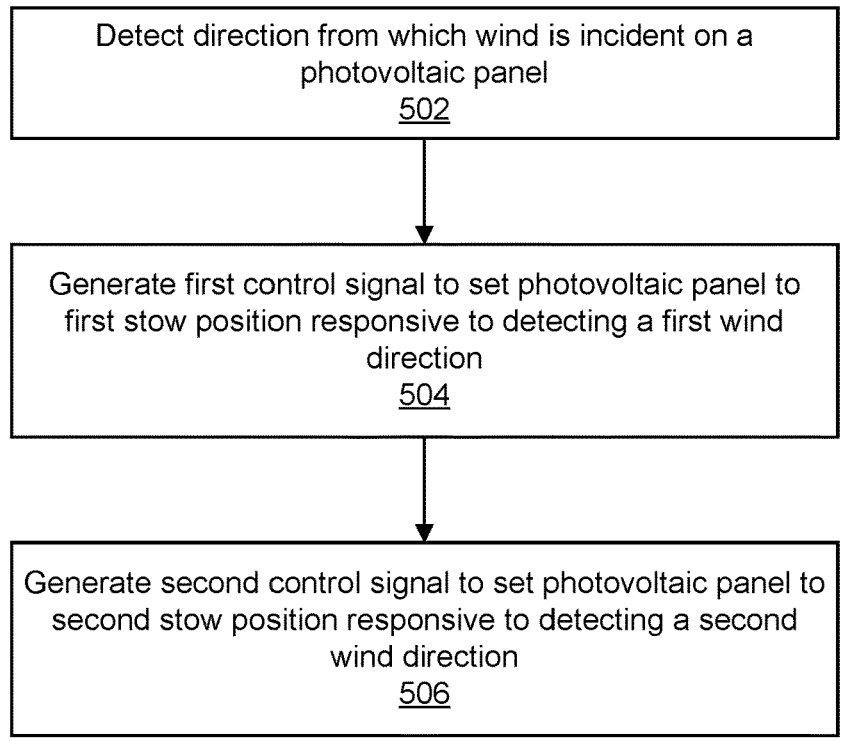
FIG. 5 is a flowchart illustrating an adaptive stow process.

When a PV system 100 is installed, its controller 130 can perform an adaptive stow process to respond to real-time wind conditions around the PV system 100. FIG. 5 is a flowchart illustrating an adaptive stow process, according to some embodiments. The process shown in FIG. 5 can be executed by the controller 130 that is communicatively coupled to the PV panel actuator 120. For example, the process can be performed by one or more processors in the controller 130 that execute instructions stored in a computer-readable storage medium, such as a memory.

As shown in FIG. 5, the controller 130 detects 502 a direction from which wind is incident on a photovoltaic panel. The controller 130 can detect the wind direction based on a signal received from the wind direction sensor 135. In some implementations, the wind direction can be determined to have an angle of incidence on the PV panel 110 relative to a specified reference. The controller 130 can then determine whether this angle of incidence falls into one of several specified ranges of angles around the PV panel 110.

If the controller 130 detects that the wind is incident on the panel from a first direction, the controller 130 generates 504 a control signal to set the position of the PV panel 110 to a first stow position. For example, if the wind is incident from a predominantly eastward direction, the controller 130 can set the PV panel 110 to a first stow position in which an east-facing edge of the PV panel 110 is angled downward.

If the controller 130 detects that the wind is incident on the panel from a second direction different from the first direction, the controller 130 generates 506 a control signal to set the position of the PV panel 110 to a second stow position. For example, if the wind is incident from a predominantly westward direction, the controller 130 can set the PV panel 110 to a second stow position in which a west-facing edge of the PV panel 110 is angled downward. Alternatively, if wind is incident from a predominantly northward or southward direction, the controller 130 can set the PV panel 110 to a second stow position in which the PV panel 110 is approximately parallel to a horizontal axis.

The controller 130 can continuously monitor the wind direction while the PV system 100 is operated, repeating steps of the process shown in FIG. 4 to change the stow position as needed based on changing wind conditions.

Embodiments of the adaptive stow systems and methodologies described herein enable the PV system 100 to withstand wind forces while reducing system design requirements. The methods and systems described herein can be applied to any of a variety of solar tracking systems with different configurations than shown in FIGS. 1-2. For example, because wind tunnel testing can be used to select the parameters of adaptive stow applied to a given PV system, similar processes can be used for multiple different types of PV systems.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A solar tracker system, comprising:
 a first tracker that directs a first photovoltaic panel having a first planar surface, the first tracker fixedly attached to and mounted on a first base;
 a first actuator configured to adjust a specific angular position of the first photovoltaic panel relative to the first base about a first axis;
 a sensor configured to detect the direction of the incoming wind flow; and
 a first controller communicatively coupled to the first actuator, the first controller configured to cause the first actuator to position the first photovoltaic panel relative to a direction of a given incoming wind flow experienced by the first photovoltaic panel, wherein the first planar surface of the first photovoltaic panel is angled toward the given incoming wind flow, the angle of the photovoltaic panel corresponds to a low angle stow in response to the sensor detecting a wind direction parallel to the first axis and a higher angle stow in response to the sensor detecting the wind direction as perpendicular to the first axis.

2. The solar tracker system of claim 1, wherein the first controller is further configured to cause the first actuator to position the first photovoltaic panel into one of a set of preconfigured positions about the first axis wherein the preconfigured positions are consecutive incremental positions about the first axis that correspond to the direction of the incoming wind flow in a 180 degree arc about the first axis and on a horizonal plane.

3. The solar tracker system of claim 2, wherein responsive to the direction of the incoming wind flow being predominantly parallel to the first axis the preconfigured position of the first photovoltaic panel corresponds to a predominantly horizontal angle of the first planar surface.

4. The solar tracker system of claim 1, wherein the first controller is configured to cause the first actuator to position the first photovoltaic panel in response to an incoming wind speed exceeding a first predetermined threshold.

5. The solar tracker system of claim 1, wherein the specific angular positions are selected based on wind tunnel testing of the solar tracker system.

6. A solar tracker system, comprising:
an array of trackers directing photovoltaic panels configured to have a variable angular position about a first axis, wherein at a first panel and a second panel of the array of photovoltaic panels are positioned independent of one another; and
a controller configured to receive wind data from an array of sensors, the wind data indicating a direction of incoming wind flow, the controller further configured to generate instructions to cause the first panel and the second panel to set a stow position relative to the direction of the incoming wind flow, wherein a planar surface of the first panel and the second panel respectively are angled based on the wind flow as experienced by each, the angle of the first panel and the second panel corresponds to a low angle stow in response to the sensor detecting a wind direction parallel to the first axis and a higher angle stow in response to the sensor detecting the wind direction as perpendicular to the first axis.

7. The solar tracker system of claim 6, wherein the controller is configured to generate differing instructions that set a stow position for the first panel and the second panel based on a relative position of the first panel and the second panel in the array of photovoltaic panels with respect to a leading edge of the array of photovoltaic panels to the direction of the incoming wind flow.

8. The solar tracker of claim 6, wherein the controller is configured to generate differing instructions that set a stow position for the first panel and the second panel based on differing magnitudes or directions of incoming wind flow experienced by the first panel and second panel respectively.

9. The solar tracker system of claim 6, wherein the controller is further configured to cause stow positions of the first panel and the second panel to individually be one of a set of preconfigured positions about the first axis wherein the preconfigured positions are consecutive incremental positions about the first axis that correspond to the direction of the incoming wind flow in a 180 degree arc about the first axis and on a horizonal plane.

10. The solar tracker system of claim 9, wherein responsive to the direction of the incoming wind flow being predominantly parallel to the first axis the reconfigured position of the first panel and second panel corresponds to a predominantly horizontal angle.

11. The solar tracker system of claim 6, wherein the controller is configured to cause the first panel and second panel to set a stow position in response to an incoming wind speed exceeding a predetermined threshold.

12. The solar tracker system of claim 6, wherein stow positions for the first panel and the second panel are further determined based on relative locations of the first panel and the second panel within a solar panel array.

13. A method of positioning a photovoltaic panel comprising:
receiving, by a controller communicatively coupled with an actuator of a photovoltaic panel, wind data indicating a direction of an incoming wind flow experienced by the photovoltaic panel; and
in response to said receiving, generating a control signal, by the controller that directs the actuator to position the photovoltaic panel about a first axis and relative to the direction of the incoming wind flow, wherein a planar surface of the photovoltaic panel is angled toward the wind flow, wherein the angle of the first panel and the second panel corresponds to a low angle stow in response to the sensor detecting a wind direction parallel to the first axis and a higher angle stow in response to the sensor detecting the wind direction as perpendicular to the first axis.

14. The method of claim 13, wherein the control signal is further configured to cause the actuator to position the photovoltaic panel into one of a set of preconfigured positions about the first axis wherein the preconfigured positions are consecutive incremental positions about the first axis that correspond to the direction of the incoming wind flow in a 180 degree arc about the first axis and on a horizonal plane.

15. The method of claim 14, wherein responsive to the direction of the incoming wind flow being predominantly parallel to the first axis the preconfigured position of the photovoltaic panel corresponds to a prominently horizontal angle of the planar surface.

16. The method of claim 14, further comprising:
detecting, by a sensor communicatively coupled to the controller, the direction of incoming wind flow.

17. The method of claim 14, wherein the controller is configured to cause the actuator to position the photovoltaic panel in response to the incoming wind speed exceeding a predetermined threshold.

18. A method of positioning an array of photovoltaic panels comprising:
receiving, by a controller communicatively coupled with a set of respective actuators corresponding to a first panel and a second panel of the array of photovoltaic panels, wind data indicating a direction of an incoming wind flow experienced by the first panel and second panel; and
in response to said receiving, generating a control signal, by the controller that directs the set of respective actuators to position the first panel and the second panel relative to the direction of the incoming wind flow, wherein the first panel and the second panel are positioned independent of one another and a planar surface of the first panel and the second panel respectively are angled based on the wind flow as experienced by each, the angle of the first panel and the second panel corresponds to a low angle stow in response to the sensor detecting a wind direction parallel to the first axis and a higher angle stow in response to the sensor detecting the wind direction as perpendicular to the first axis.

19. The method of claim 18, wherein the controller is configured to generate differing control signals that set the position for the first panel and the second panel based on a relative position of the first panel and the second panel in the array of photovoltaic panels with respect to a leading edge of the array of photovoltaic panels to the direction of the incoming wind flow.

20. The method of claim 18, wherein the controller is configured to generate differing instructions that set the position for the first panel and the second panel based on differing magnitudes or directions of incoming wind flow experienced by the first panel and second panel respectively.

21. The method of claim 18, wherein the controller is further configured to cause the positions of the first panel and the second panel to individually be one of a set of preconfigured positions about the first axis wherein the preconfigured positions are consecutive incremental positions about the first axis that correspond to the direction of the incoming wind flow in a 180 degree arc about the first axis and on a horizonal plane.

22. The method of claim 21, wherein responsive to the direction of the incoming wind force being predominantly parallel to the first axis the preconfigured position of the first panel and second panel corresponds to a predominantly horizontal angle.

23. The method of claim 18, wherein the control signal is configured to cause the respective actuators of the first panel and second panel to set a position in response to an incoming wind speed exceeding a predetermined threshold.

* * * * *